United States Patent
Lewis et al.

(10) Patent No.: US 11,288,351 B2
(45) Date of Patent: *Mar. 29, 2022

(54) DELAYED TWO-FACTOR AUTHENTICATION IN A NETWORKED ENVIRONMENT

(71) Applicant: Google LLC, Mountain View, CA (US)

(72) Inventors: Justin Lewis, South San Francisco, CA (US); Ruxandra Davies, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 15/775,754

(22) PCT Filed: Apr. 25, 2018

(86) PCT No.: PCT/US2018/029403
§ 371 (c)(1),
(2) Date: May 11, 2018

(87) PCT Pub. No.: WO2019/209293
PCT Pub. Date: Oct. 31, 2019

(65) Prior Publication Data
US 2020/0304493 A1    Sep. 24, 2020

(51) Int. Cl.
*G06F 21/34*    (2013.01)
*G10L 15/18*    (2013.01)
(Continued)

(52) U.S. Cl.
CPC .......... *G06F 21/34* (2013.01); *G10L 15/1822* (2013.01); *H04L 63/0853* (2013.01); *G06F 40/20* (2020.01); *H04L 2463/082* (2013.01)

(58) Field of Classification Search
CPC . H04L 63/0853; H04L 63/0861; G06F 21/34; G10L 15/1822
See application file for complete search history.

(56) References Cited

U.S. PATENT DOCUMENTS 7,925,590 B2    4/2011    Jain
8,504,652 B2    8/2013    Rothschild
(Continued)

FOREIGN PATENT DOCUMENTS

| EP | 2 698 735 | 2/2014 |
|----|-----------|--------|
| JP | 2009071430 | 4/2009 |
| JP | 2015099470 A | 5/2015 |

OTHER PUBLICATIONS

Non-Final Office Action for U.S. Appl. No. 16/039,208 dated May 13, 2020 (18 pages).

(Continued)

*Primary Examiner* — Oleg Korsak
(74) *Attorney, Agent, or Firm* — Dority & Manning, P.A.

(57) ABSTRACT

Systems and methods of the present disclosure enable for a delayed, two-factor authentication to occur in networked devices. The system and methods can enable the immediate delivery of digital components, which results in fewer abandoned requests, and saves network resources. The system and methods can enable the authorization of data transmissions in networked computer devices that include limited user interfaces, such as voice-based interfaces.

20 Claims, 4 Drawing Sheets

(51) Int. Cl.
*H04L 29/06* (2006.01)
*G06F 40/20* (2020.01)

(56) References Cited

U.S. PATENT DOCUMENTS

| | | | |
|---|---|---|---|
| 9,065,824 | B1 | 6/2015 | Valdivia |
| 9,088,550 | B1 | 7/2015 | Taraki et al. |
| 10,027,662 | B1* | 7/2018 | Mutagi .................... G10L 15/22 |
| 10,665,244 | B1 | 5/2020 | Gupta et al. |
| 2004/0187024 | A1 | 9/2004 | Briscoe et al. |
| 2004/0205335 | A1 | 10/2004 | Park |
| 2007/0186099 | A1 | 8/2007 | Beck et al. |
| 2007/0208953 | A1 | 9/2007 | Durand et al. |
| 2008/0148067 | A1 | 6/2008 | Sitrick et al. |
| 2008/0256646 | A1 | 10/2008 | Strom et al. |
| 2009/0083541 | A1 | 3/2009 | Levine |
| 2009/0083807 | A1 | 3/2009 | Stephan et al. |
| 2009/0158402 | A1 | 6/2009 | Ding |
| 2009/0199305 | A1 | 8/2009 | Michiels et al. |
| 2009/0276633 | A1 | 11/2009 | Silverbrook et al. |
| 2010/0115592 | A1 | 5/2010 | Belz et al. |
| 2010/0153730 | A1 | 6/2010 | Goria |
| 2010/0242091 | A1 | 9/2010 | Xu et al. |
| 2010/0304714 | A1 | 12/2010 | Chao et al. |
| 2012/0250861 | A1 | 10/2012 | Ishii et al. |
| 2013/0055368 | A1 | 2/2013 | Bauckman et al. |
| 2013/0061296 | A1 | 3/2013 | Reddy et al. |
| 2013/0212637 | A1 | 8/2013 | Guccione et al. |
| 2014/0052873 | A1* | 2/2014 | Watson .................... G06F 21/10 709/231 |
| 2014/0075550 | A1 | 3/2014 | Mirashrafi et al. |
| 2014/0222436 | A1 | 8/2014 | Binder et al. |
| 2014/0273963 | A1 | 9/2014 | Su et al. |
| 2015/0026708 | A1* | 1/2015 | Ahmed .................... G06F 3/011 725/12 |
| 2015/0200944 | A1 | 7/2015 | Zhang et al. |
| 2016/0337370 | A1 | 11/2016 | Lipscomb |
| 2016/0342781 | A1 | 11/2016 | Jeon |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0124302 | A1* | 5/2017 | Baldwin ................. G06F 21/10 |
| 2017/0132019 | A1 | 5/2017 | Karashchuk et al. |
| 2017/0142584 | A1 | 5/2017 | Oh et al. |
| 2017/0171200 | A1 | 6/2017 | Bao et al. |
| 2017/0236524 | A1 | 8/2017 | Ray et al. |
| 2017/0358301 | A1 | 12/2017 | Raitio et al. |
| 2018/0007060 | A1 | 1/2018 | Leblang et al. |
| 2018/0014189 | A1 | 1/2018 | Ellison et al. |
| 2018/0014197 | A1 | 1/2018 | Arana |
| 2018/0190275 | A1 | 7/2018 | Bhaya et al. |
| 2018/0336905 | A1 | 11/2018 | Kim et al. |
| 2019/0166403 | A1* | 5/2019 | Yelton ................. H04N 21/8405 |
| 2019/0272365 | A1 | 9/2019 | Huh et al. |
| 2019/0325080 | A1* | 10/2019 | Natarajan ........... G06F 16/9532 |
| 2020/0029214 | A1 | 1/2020 | Aylward et al. |
| 2021/0119794 | A1* | 4/2021 | Shpurov ............... G10L 13/027 |

OTHER PUBLICATIONS

"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . ", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take The Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, And Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant', BBC News, Oct. 19, 2017, 6 pages.
Lee, Dave, "The five big announcements from Google I/O", BBC News, May 18, 2017 (9 pages).

(56) References Cited

OTHER PUBLICATIONS

Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
International Search Report and Written Opinion for PCT/US2018/029403 dated Dec. 4, 2018.
International Preliminary Report on Patentability for PCT Appln. Ser. No. PCT/US2018/029403 dated Nov. 5, 2020 (9 pages).
Non-Final Office Action for U.S. Appl. No. 16/039,208 dated Mar. 8, 2021 (33 pages).
Extended European Search Report for EP Appln. Ser. No. 20186050.9 dated Oct. 6, 2020 (5 pages).
Final Office Action for U.S. Appl. No. 16/039,208 dated Oct. 8, 2020 (20 pages).
Notice of Allowance for U.S. Appl. No. 16/039,208 dated Jun. 30, 2021 (14 pages).

\* cited by examiner

DELAYED TWO-FACTOR AUTHENTICATION IN A NETWORKED ENVIRONMENT

CROSS-REFERENCES TO RELATED APPLICATIONS

This application claims the benefit of priority under 35 U.S.C. § 371 as a U.S. National Stage of International Patent Application No. PCT/US2018/029403, filed Apr. 25, 2018 and designating the United States, which is hereby incorporated by reference herein in its entirety.

BACKGROUND

Computing devices can provide digital content to networked client devices. The computing devices may require authentication or authorization before transmitting the content to the networked client devices. It may be challenging to authenticate client devices with limited user interfaces, such as voice-driven interfaces.

SUMMARY

According to at least one aspect of the disclosure, a system to authenticate computing devices can include a data processing system. The data processing system can execute a natural language processor component, a content selection component, and an authorization component. The data processing system can receive an input audio signal detected by a sensor at a first client device. The natural language processor component can parse the input audio signal to identify a first digital component request in the input audio signal. The content selection component can transmit a first portion of the first digital component to the first client device. The authorization component can transmit an authorization request to a second client device to authorize transmission of a second portion of the digital component to the first client device. The authorization request can be transmitted to the second client device based at least on transmitting the first portion of the first digital component to the first client device. The authorization component can receive, from the second client device, a confirmation message in response to the authorization request. The content selection component can transmit the second portion of the digital component to the first client device based at least on receiving the confirmation message from the second client device.

According to at least one aspect of the disclosure, a method to authenticate computing devices can include receiving, by a natural language processor component executed by a data processing system and via an interface of the data processing system, an input audio signal detected by a sensor at a first client device. The method can include parsing, by the natural language processor component, the input audio signal to identify a first digital component request in the input audio signal. The method can include transmitting, by a content selection component, a first portion of the first digital component to the first client device. The method can include transmitting, by an authorization component, an authorization request to a second client device to authorize transmission of a second portion of the digital component to the first client device. The authorization request can be transmitted to the second client device based at least on transmitting the first portion of the first digital component to the first client device. The method can include receiving, by the authorization component from the second client device, a confirmation message in response to the authorization request. The method can include transmitting, by the content selection component, the second portion of the digital component to the first client device based at least on receiving the confirmation message from the second client device.

According to at least one aspect of the disclosure, a system to authenticate computing devices in a networked environment a data processing system that can include one or more processors and memory. The one or more processors can execute a natural language processor component, a content selection component, and an authorization component. The system can receive, by the natural language processor component, an input audio signal detected by a sensor at a first client device. The system can parse, by the natural language processor component, the input audio signal to identify a first digital component request in the input audio signal. The system can select, by the content selection component, a first digital component and a second digital component based at least on the first digital component request. The system can transmit, by the content selection component and to the first client device, a first portion of the first digital component. The system can transmit, by the authorization component and to a second client device to authorize transmission of a second portion of the digital component to the first client device, an authorization request transmitted to the second client device based at least on transmitting the first portion of the first digital component to the first client device. The system can transmit, by the content selection component and to the second client device, the second digital component. The system can transmit, by the content selection component, the second portion of the digital component to the first client device based at least on receiving a confirmation message generated in response to the authorization request.

According to at least one aspect of the disclosure, a method to authenticate computing devices can include receiving, by a natural language processor component, an input audio signal detected by a sensor at a first client device. The method can include parsing, by the natural language processor component, the input audio signal to identify a first digital component request in the input audio signal. The method can include selecting, by a content selection component, a first digital component and a second digital component based at least on the first digital component request. The method can include transmitting, by the content selection component and to the first client device, a first portion of the first digital component. The method can include transmitting, by an authorization component and to a second client device to authorize transmission of a second portion of the digital component to the first client device, an authorization request transmitted to the second client device based at least on transmitting the first portion of the first digital component to the first client device. The method can include transmitting, by the content selection component and to the second client device, the second digital component. The method can include transmitting, by the content selection component, the second portion of the digital component to the first client device based at least on receiving a confirmation message generated in response to the authorization request.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
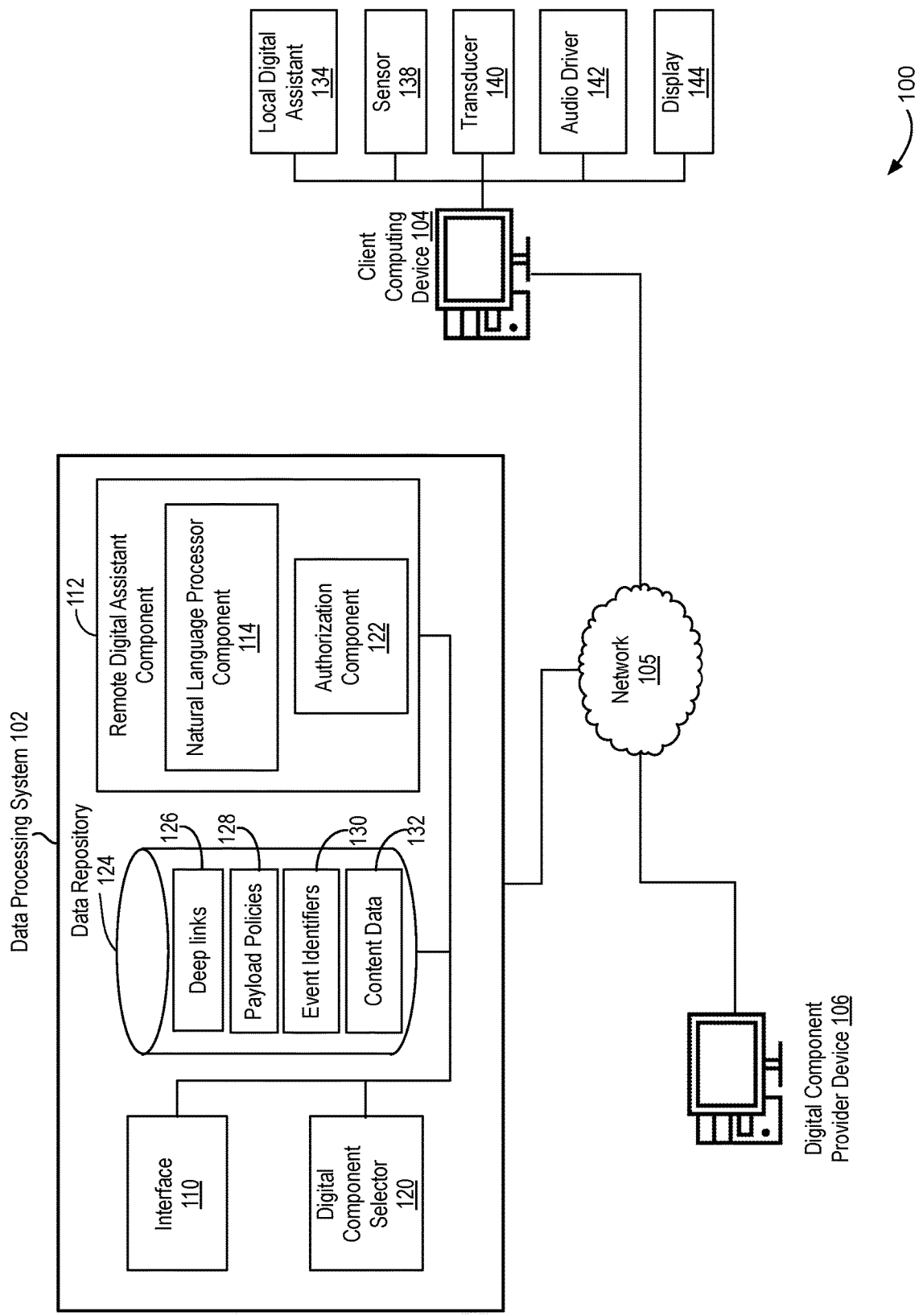
FIG. 1 illustrates block diagram of an example system to authenticate computing devices, in accordance with an example of the present disclosure.

Following below are more detailed descriptions of various concepts related to, and implementations of, methods, apparatuses, and systems of transferring data in a secure processing environment. The various concepts introduced above and discussed in greater detail below may be implemented in any of numerous ways. The present disclosure is generally directed to authentication of audio-based interaction devices in an interconnected network. For example, a digital assistant component can receive audio input that can include speech. The speech can include a request for content. The digital assistant component can request the content from a third-party responsive to the audio input. Delivery of the content to the digital assistant component can require authorization. It can be challenging to authenticate devices that the use a voice-based interface. For example, some input can be difficult or insecure to provide through a voice-based interface, such as credit card numbers or passwords that the end user may not want to speak aloud for privacy and security concerns. Additionally, it can be challenging or inefficient to authorize devices with voice-based interfaces because generating a conversational interface to authorize the content delivery can result in consuming excessive computing resources, such as processor and memory resources, network bandwidth, or remote procedure calls. Additionally, requiring immediate authorization through the non-voice-based interface of a second device can result in wasted network resources as the end user often abandons the request rather than switching to interface through a second device.

Systems and methods of the present technical solution enable for a delayed, two-factor authentication to occur in networked devices that improves the delivery of requested digital components while reducing computing resource utilization, network bandwidth, or remote procedure calls. For example, the systems and methods of the present technical solution enable the immediate delivery of digital components, which results in fewer abandoned requests, while the digital component delivery is authorized through a delay two-factor authentication process.

In an illustrative example, voice-driven (and hands free) digital assistant devices can be used to request digital components. The digital components can be provided through a subscription-based service (e.g., a streaming music service) or may require payment authorization (e.g., purchasing a song). Delivery of the digital component to the digital assistant can require authorization at a second, non-voice-driven client device. This system of the present technical solution can include a state machine. The state machine can track both the enabled state of the services providing the digital component (for the digital assistant) and the authentication state of the digital assistant.

Responsive to the request for the content, the system can provide the requested content to the digital assistant even if the state of the state machine is in a non-authenticated state. The system can transmit an authorization request to a second client device that is associated with the digital assistant. The system can provide the second client device with a predetermined amount of time to respond to the authorization request. During this predetermined amount of time, the digital assistant can render or present the requested digital component. Once the authorization request is received, the second device can show a notification with a confirm option and a reject option, or the notification might open a dialog with those options. The second client device can automatically approve the authorization request based on local device state, such as if the second client device is within a predetermined distance of the digital assistant. When the end user confirms the dialog (or otherwise positively engages with the authorization request), the second client device can send the system an authentication token and a unique action identifier. The system can use the authentication token and the unique action identifier to change the digital assistant's state machine to an authorized state.

A primary engagement action will enable a disabled service ephemerally and syndicate a notification to a second device. This change of state will also include a timestamp denoting when the ephemeral state is no longer valid. This notification will include a payload with an action that has two sets of parameters, the first parameter is an instruction to authenticate the user and a dialog component (or reference to dialog component) which informs the user about which specific action is being authenticated, and the second parameter is a specific action or event identifier for the action to be authenticated.

FIG. 1 illustrates an example system 100 to authenticate devices in a networked environment. The system 100 can include a digital component selection infrastructure. The system 100 can include a data processing system 102. The data processing system 102 can communicate with one or more of a digital component provider device 106 (e.g., content provider device) or client computing devices 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, digital assistant, personal digital assistant, smartwatch, wearable device, smart phone, portable computers, or speaker. For example, via the network 105 a user of the client computing device 104 can access information or data provided by a digital component provider device 106. The client computing device 104 may or may not include a display. For example, the client computing device 104 may include limited types of user interfaces, such as a microphone and speaker (e.g., the client computing device 104 can include a voice-drive or audio-based interface). The primary user interface of the computing device 104 can include a microphone and speaker.

The network 105 can include or constitute a display network, e.g., a subset of information resources available on the internet that are associated with a content placement or search engine results system, or that are eligible to include third party digital components. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the digital component provider device 106.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example, with the computing device 104 or the digital component provider device 106. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The client computing device 104 can include, execute, interface, or otherwise communicate with one or more of at least one local digital assistant 134, at least one sensor 138, at least one transducer 140, at least one audio driver 142, or at least one display 144. The sensor 138 can include, for example, a camera, an ambient light sensor, proximity sensor, temperature sensor, accelerometer, gyroscope, motion detector, GPS sensor, location sensor, microphone, video, image detection, or touch sensor. The transducer 140 can include or be part of a speaker or a microphone. The audio driver 142 can provide a software interface to the hardware transducer 140. The audio driver 142 can execute the audio file or other instructions provided by the data processing system 102 to control the transducer 140 to generate a corresponding acoustic wave or sound wave. The display 144 can include one or more hardware or software component configured to provide a visual indication or optical output, such as a light emitting diode, organic light emitting diode, liquid crystal display, laser, or display.

The local digital assistant 134 can include or be executed by one or more processors, logic array, or memory. The local digital assistant 134 can detect a keyword and perform an action based on the keyword. The local digital assistance 134 can be an instance of the remote digital assistance component 112 executed at the data processing system 102 or can perform any of the functions of the remote digital assistance component 112. The local digital assistant 134 can filter out one or more terms or modify the terms prior to transmitting the terms as data to the data processing system 102 (e.g., remote digital assistant component 112) for further processing. The local digital assistant 134 can convert the analog audio signals detected by the transducer 140 into a digital audio signal and transmit one or more data packets carrying the digital audio signal to the data processing system 102 via the network 105. The local digital assistant 134 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The local digital assistant 134 can perform a pre-filtering or pre-processing on the input audio signal to remove certain frequencies of audio. The pre-filtering can include filters such as a low-pass filter, high-pass filter or a bandpass filter. The filters can be applied in the frequency domain. The filters can be applied using a digital signal processing techniques. The filter can be configured to keep frequencies that correspond to a human voice or human speech, while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. The local digital assistant 134 on the computing device 104 can apply the bandpass filter prior to transmitting the input audio signal to the data processing system 102, thereby reducing network bandwidth utilization. However, based on the computing resources available to the computing device 104 and the available network bandwidth, it may be more efficient to provide the input audio signal to the data processing system 102 to allow the data processing system 102 to perform the filtering.

The local digital assistant 134 can apply additional pre-processing or pre-filtering techniques such as noise reduction techniques to reduce ambient noise levels that can interfere with natural language processor. Noise reduction techniques can improve accuracy and speed of natural language processor, thereby improving the performance of the data processing system 102 and manage rendering of a graphical user interface provided via the display 144.

The client computing device 104 can be associated with an end user that enters voice queries as audio input into the client computing device 104 (via the sensor 138 or transducer 140) and receives audio (or other) output from the data processing system 102 or digital component provider device 106 to present, display, or render to the end user of the client computing device 104. The digital component can include a computer-generated voice that can be provided from the data processing system 102 or digital component provider device 106 to the client computing device 104. The client computing device 104 can render the computer-generated voice to the end user via the transducer 140 (e.g., a speaker). The computer-generated voice can include recordings from a real person or computer generated language. The client computing device 104 can provide visual output via a display device 144 communicatively coupled to the computing device 104.

The end user that enters the voice queries to the client computing device 104 can be associated with multiple client computing devices 104. For example, the end user can be associated with a first client computing device 104 that can be a speaker-based digital assistant device, a second client computing device 104 that can be a mobile device (e.g., a smartphone), and a third client computing device 104 that can be a desktop computer. The data processing system 102 can associate each of the client computing devices 104 through a common login, location, network, or other linking data. For example, the end user may log into each of the client computing devices 104 with the same account user name and password.

The client computing device 104 can receive an input audio signal detected by a sensor 138 (e.g., microphone) of the computing device 104. The input audio signal can include, for example, a query, question, command, instructions, or other statement provided in a language. The input audio signal can include an identifier or name of a third-party (e.g., a digital component provider device 106) to which the question or request is directed. For example, the query can include the name of the subscription-based music service (an example digital component provider device 106) in the input audio signal in order to instruct the data processing system 102 to provide the request to the specified subscription-based music service. For example, the input audio signal can include "Play my music playlist on XYZ Music Service." The music service can provide the songs associated with the playlist to the client computing device 104 through the network 105 or to the data processing system 102, which can provide the songs associated with the playlist to the client computing device 104 through the network 105.

The client computing device 104 can include, execute, or be referred to as a digital assistant device. The digital assistant device can include one or more components of the computing device 104. The digital assistant device can include a graphics driver that can receive display output from the data processing system 102, and render the display output on display 132. The graphics driver can include hardware or software components that control or enhance or how graphics or visual output is displayed on the display 144. The graphics driver can include, for example, a program that controls how the graphic components work with the rest of the computing device 104 (or digital assistant). The local digital assistant 134 can filter the input audio signal to create a filtered input audio signal, convert the filtered input audio signal to data packets, and transmit the data packets to a data processing system comprising one or more processors and memory.

The digital assistant device can include an audio driver 142 and a speaker component (e.g., transducer 140). The pre-processor component 140 to receive an indication of the display output and instruct the audio driver 142 to generate an output audio signal to cause the speaker component (e.g., transducer 140) to transmit an audio output corresponding to the indication of the display output.

The system 100 can include, access, or otherwise interact with at least digital component provider device 106. The digital component provider device 106 can include one or more servers that can provide digital components to the client computing device 104 or data processing system 102. The digital component provider device 106 or components thereof can be integrated with the data processing system 102, or executed at least partially by the data processing system 102. The digital component provider device 106 can include at least one logic device such as a computing device having a processor to communicate via the network 105, for example with the computing device 104, the data processing system 102, or the digital component provider device 106. The digital component provider device 106 can include at least one computation resource, server, processor or memory. For example, the digital component provider device 106 can include a plurality of computation resources or servers located in at least one data center.

A digital component provider device 106 can provide audio, visual, or multimedia based digital components for presentation by the client computing device 104 as an audio output digital component or visual output digital components. The digital component can be or include a digital content. The digital component can be or include a digital object. The digital component can include subscription-based content or pay-for content. A digital component can include a plurality of digital content items. For example, a digital component can be a data stream from a streaming music service (e.g., the digital component provider device 106). The streamed digital component can include multiple songs as different digital content items. The digital components can include or can be digital movies, websites, songs, applications (e.g., smartphone or other client device applications), or other text-based, audio-based, image-based, or video-based content.

The digital component provider device 106 can provide the digital components to the client computing device 104 via the network 105 and bypass the data processing system 102. The digital component provider device 106 can provide the digital component to the client computing device 104 via the network 105 and data processing system 102. For example, the digital component provider device 106 can provide the digital components to the data processing system 102, which can store the digital components and provide the digital components to the client computing device 104 when requested by the client computing device 104.

The data processing system 102 can include at least one computation resource or server. The data processing system 102 can include, interface, or otherwise communicate with at least one interface 110. The data processing system 102 can include, interface, or otherwise communicate with at least one remote digital assistant component 112. The remote digital assistant component 112 can include, interface, or otherwise communicate with at least one natural language processor component 114. The data processing system 102 can include, interface, or otherwise communicate with at least one digital component selector 120. The data processing system 102 can include, interface, or otherwise communicate with at least one authorization component 122. The data processing system 102 can include, interface, or otherwise communicate with at least one data repository 124. The at least one data repository 124 can include or store, in one or more data structures or databases, deep links 126, payload policies 128, event identifiers 130, or content data 132. The data repository 124 can include one or more local or distributed databases, and can include a database management The interface 110, remote digital assistant component 112, the natural language processor component 114, the digital component selector 120, and the authorization component 122 can each include at least one processing unit or other logic device such as programmable logic array engine, or module configured to communicate with the database repository or database 124. The interface 110, the remote digital assistant component 112, the natural language processor component 114, the digital component selector 120, the authorization component 122, and the data repository 124 can be separate components, a single component, or part of multiple data processing systems 102. The system 100 and its components, such as a data processing system 102, can include hardware elements, such as one or more processors, logic devices, or circuits.

The data processing system 102 can include an interface 110. The interface 110 can be configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as a local digital assistant 134 to communicate input audio signals to the interface 110 of the data processing system 102 and to drive components of the client computing device to render output audio signals or visual output. The data processing system 102 can receive data packets, a digital file, or other signals that include or identify an input audio signal (or input audio signals). The computing device 104 can detect the audio signal via the transducer 140, and convert the analog audio signal to a digital file via an analog-to-digital converter. For example, the audio driver 142 can include an analog-to-digital converter component. The pre-processor component 140 can convert the audio signals to a digital file that can be transmitted via data packets over network 105.

The remote digital assistant component 112 of the data processing system 102 can execute or run an NLP component 114 to receive or obtain the data packets including the input audio signal detected by the sensor 138 of the computing device 104. The data packets can provide a digital file. The NLP component 114 can receive or obtain the digital file or data packets comprising the audio signal and parse the audio signal. For example, the NLP component 114 can provide for interactions between a human and a computer. The NLP component 114 can be configured with techniques for understanding natural language and enabling the data processing system 102 to derive meaning from human or natural language input. The NLP component 114 can include or be configured with techniques based on machine learning, such as statistical machine learning. The NLP component 114 can utilize decision trees, statistical models, or probabilistic models to parse the input audio signal. The NLP component 114 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 114 can convert the input audio signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 114 matches the text to words that are associated, for example via training across users or through manual specification, with actions that the data processing system 102 can serve. The NLP component 114 can convert image or video input to text or digital files. The NLP component 114 can process, analyze or interpret image or video input to perform actions, generate requests, or select or identify data structures.

The data processing system 102 can receive image or video input signals, in addition to, or instead of, input audio signals. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, machine learning techniques can be collectively referred to as imaging techniques. The data processing system 102 (e.g., the NLP component 114) can be configured with the imaging techniques, in addition to, or instead of, audio processing techniques.

The NLP component 114 can obtain the input audio signal. From the input audio signal, the NLP component 114 can identify at least one request or at least one trigger keyword corresponding to the request. The request can indicate intent, digital components, or subject matter of the input audio signal. The trigger keyword can indicate a type of action likely to be taken. For example, the NLP component 114 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 114 can parse the input audio signal to identify, determine, retrieve, or otherwise obtain the request and the trigger keyword. For instance, the NLP component 114 can apply a semantic processing technique to the input audio signal to identify the trigger keyword or the request. The NLP component 114 can apply the semantic processing technique to the input audio signal to identify a trigger phrase that includes one or more trigger keywords, such as a first trigger keyword and a second trigger keyword. For example, the input audio signal can include the sentence "Play my favorite song." The NLP component 114 can determine that the input audio signal includes a trigger keyword "play." The NLP component 114 can determine that the request is for the end user's favorite song (a digital component). The NLP component 114 can identify an application identifier or a digital component provider device 106 identifier in the input audio signal. The application identifier or digital component provider device 106 identifier can indicate which application or digital component provider device 106 the end user would like to fill the request.

The data processing system 102 can execute or run an instance of the authorization component 122. The authorization component 122 can enable the data processing system 102 to perform delayed, two-factor authentication. The digital component identified by the NLP component 114 in the input audio signal can be provided to the client computing device 104 from a digital component provider device 106. To provide the digital component to the client computing device 104, the digital component provider device 106 or the data processing system 102 can require authorization. The authorization component 122 can enable a portion of the digital component to be transmitted or streamed to the client computing device 104 responsive to the request for the digital component and before the transmission of the full digital component is authorized. For example, the portion of the digital component can be transmitted to the client computing device 104 before authorization of the client computing device has started or has been completed.

The authorization component 122 can include a state machine that can determine whether the client computing device 104 is authorized to receive digital components from the digital component provider device 106 and whether the digital component provider device 106 is enabled for the client computing device 104. Once the digital component provider device 106 is enabled for the client computing device 104, the default state for the client computing device 104 can be a non-authorized state. When in the non-authorized state, the authorization component 122 may only provide portions of requested digital components to the client computing device 104.

Based on receiving the request for a digital component, the digital component selector 120 can select a portion of the digital component to transmit to the first client computing device 104 that transmitted the input audio signal to the data processing system 102. Based at least on transmitting the portion of the first digital component to the first client device, the authorization component 122 can transmit an authorization request to a second client device. The authorization request can include a request to authorize transmission of a second portion (or the remainder) of the requested digital component to the first client computing device 104. The authorization request can include a digital message or other engagement signal that can be transmitted or pushed to the client computing device 104. For example, the authorization request can include a notification, SMS, email, or other electronic message that is transmitted from the data processing system 102 to the second client computing device 104.

The authorization component 122 can select a dialog component, action identifier or event identifier, or other parameters to include in the authorization request. The dialog component can include deep links selected from the deep links 126 stored in the data repository 124. Execution of the deep link at the client computing device 104 can cause the client computing device 104 to open a predetermined application executed on the client computing device 104. The deep link can include information that is populated into one or more fields of the open application's window. Rendering the authorization request at the second client computing device 104 can cause the second client computing device 104 to present dialog including a confirm option or a reject option.

The authorization component 122 can receive via the interface 110 and network 105 a confirmation message. The client computing device 104 can generate the confirmation message in response the activation of the confirm option. For example, the authorization request can cause the client computing device 104 to display a notification window asking the end user of the client computing device 104 whether the user would like to authenticate the transmission of a digital component to a different client computing device 104 associated with the end user (e.g., the client computing device 104 that transmitted the input audio signal to the data processing system 102). The notification window can render the confirm option as an accept button and the rejection option as a decline button. Selection of the confirm option can cause the client computing device 104 to generate and transmit the confirmation message to the data processing system 102. Selection of the reject option can cause the client computing device 104 to generate and transmit a declining message to the data processing system 102.

The authorization request can include a request to transmit a predetermined or requested digital component to the client computing device 104. The authorization request can include a request to begin a subscription (e.g., a streaming music subscription) with the digital component provider device 106 that is required for the digital component to be transmitted to the client computing device 104.

The confirmation message can include an authorization token and the action or event identifier of the authorization request. The authorization component 122 can update the state machine based on receiving the authorization token to indicate that the client computing device 104 that transmitted the input audio signal to the data processing system 102 is authorized to receive the second portion of the digital component or additional digital components from the digital component provider device 106.

The authorization component 122 can reference the event identifiers 130 to determine whether the client computing device 104 previously established a connection with the digital component provider device 106 or requested digital components from the digital component provider device 106. The authorization component 122 can store an indication of the request in association with an identifier of the client computing device 104 as an event identifier 130. The authorization component 122 may only store the indication of the request if the authorization component 122 does not receive a confirmation message in response to the authorization request to provide the digital component. For example, the data processing system 102 can receive an input audio signal requesting that a song be streamed to a first client computing device 104. In response to the request, the authorization component 122 can transmit an authorization request to a second client computing device 104 that is associated with the first client computing device 104. The data processing system 102 can transmit a first portion of the requested song to the first client computing device 104. If the authorization component 122 does not receive a confirmation message within a predetermined length of time, the authorization component 122 can store as an event identifier 130 an indication that at least portion of the requested song was transmitted to the first client computing device 104.

The authorization component 122 can decline the request for a digital component based on the at least a portion of the digital component being previously transmitted to the client computing device 104 or the client computing device 104 previously requesting digital components from the digital component provider device 106. The authorization component 122 can use a unique identifier associated with the client computing device 104 to lookup in the event identifiers 130 whether the requested digital component (or a digital component from the same digital component provider device 106) was previously transmitted to the client computing device 104. For example, the data processing system 102 can receive an input audio signal requesting a music playlist be streamed to the client computing device 104 from the digital component provider device 106. The authorization component 122 can determine if the client computing device 104 previously requested the streaming of a playlist or other digital components from the digital component provider device 106. If the authorization component 122 determines digital components were previously streamed or transmitted to the client computing device 104 (without the authorization component 122 receiving a confirmation message), the authorization component 122 can prevent the data processing system 102 from streaming the requested playlist (or a portion thereof) to the client computing device 104.

The authorization component 122 can shorten the length or duration of the portion of the digital component transmitted to the client computing device 104 transmitted prior to the receipt of an authorization message based on the number of times the client computing device 104 requested the digital component without the authorization component 122 receiving a confirmation message. For example, the first time the client computing device 104 requests a movie (e.g., a digital component) from the digital component provider device 106, the authorization component 122 can select or authorize a 10-minute portion of the movie be transmitted to the client computing device 104 without receiving a confirmation message. The second time the client computing device 104 requests a movie from the digital component provider device 106, the authorization component 122 can select or authorize a 5-minute portion of the movie to be transmitted to the client computing device 104 without receiving a confirmation message. For each subsequent request, the authorization component 122 can authorize or select smaller (or shorter) subportions of the portion of the digital component transmitted to the client computing device 104 based on the first request for a digital component.

The digital component selector 120 can select a digital component that includes text, strings, characters, video files, image files, or audio files that can be processed by the client computing device 104 and presented to the user via the display 144 or the transducer 140 (e.g., speaker). The digital component selector 120 can select a digital component that is in responsive to the request identified by the NLP component 114 in the input audio signal. The digital component selector 120 can select which digital component provider device 106 should or can fulfill the request and can forward the request to the digital component provider device 106. For example, the data processing system 102 can initiate a session between the digital component provider device 106 and the client computing device 104 to enable the digital component provider device 106 to transmit the digital component to the client computing device 104. The digital component selector 120 can request digital component from the digital component provider device 106. The digital component provider device 106 can provide digital components to the data processing system 102, which can store the digital components in the data repository 124. Responsive to a request for a digital component, the digital component selector 120 can retrieve the digital component from the data repository 124.

In response to a request for a digital component, for example, the digital component selector 120 can select a portion of the digital component to provide the client computing device 104 in response to the request. The digital component selector 120 can select a portion of the digital component that corresponds to a duration or length set by the authorization component 122.

The digital component selector 120 can select multiple digital components via a real-time content selection process. The digital component selector 120 can score and rank the digital components, and provide multiple digital components to the output merger component 120 to allow the output merger component 120 to select the highest ranking digital component. The digital component selector 120 can select one or more additional digital components that are transmitted to a second client computing device 104 based on an input audio signal (or keywords and requests contained therein). The one or more additional digital components can be transmitted to the second client computing device 104 as part of or in addition to the authorization request. For example, if the input audio signal from the first client computing device 104 includes a request for a digital component from a first digital component provider device 106, the digital component selector 120 can select one or more digital components that correspond to one or more related digital component provider devices 106. In one illustrative example, the input audio signal can include a request to start a streaming music to a first client computing device 104. The digital component selector 120 can select additional digital components (e.g., ads) are associated with a different digital component provider device 106. The data processing system 102 can include the additional digital components in the authorization request to the second client computing device 104. The additional digital components can inform an end user of additional or related digital component provider devices 106 that could fulfill the request from the first client computing device 104.

The digital component selector 120 can provide the selected digital component selected in response to the request identified in the input audio signal to the computing device 104 or local digital assistant 134 or application executing on the computing device 104 for presentation. Thus, the digital component selector 120 can receive the content request from the client computing device 104, select, responsive to the content request, a digital component, and transmit, to the client computing device 104, the digital component for presentation. The digital component selector 120 can transmit, to the local digital assistant 134, the selected digital component for presentation by the local digital assistant 134 itself or a third-party application executed by the client computing device 104. For example, the local digital assistant 134 can play or output an audio signal corresponding to the selected digital component.

The data repository 124 can store deep links 126 that can be stored in one or more data structures or data files. The deep links 126 can be stored in a table or database. The deep links 126 can include links, pointers, references, or other address or location information of an application that can be executed by the client computing device 104. A deep link to an application can refer to a uniform resource locator or hyperlink that links to a specific resource, web content, application, or view within an application. The deep link can include the information used to point to a particular resource or application, launch an application, or populate predetermined fields within the application. Deep links can include uniform resource identifiers ("URI") that links to a specific location within a mobile application in addition to launching the application. For example, opening, selecting, or executing a deep link on the client computing device 104 can cause the client computing device 104 to open an application associated with the digital component provider device 106. The deep link fully or partially pre-populate a registration or sign-up form within the opened application. In this example, to register for the subscription service offered by the digital component provider device 106, the end user may need to only review the information entered into the form and then select a confirmation icon located on the loaded application page. The deep links 126 data structure can include a hash table that maps application names or views of an application to a deep link.

The data repository 124 can store payload policies 128 that can be stored in one or more data structures or data files. The payload policies 128 can indicate what data or information should be included in a deep link 126 when the deep link 126 is generated. The data processing system 102 can store a different payload policy 128 for each of the digital component provider devices 106 associated with the data processing system 102. The payload policies 128 can indicate to the data processing system 102 what information a digital component provider device 106 may need to begin or continue a subscription service or purchase process. For example, a payload policy 128 can indicate if an account name or credit card number are needed when registering with the digital component provider device 106. The payload policy 128 can also indicate to the data processing system 102 if the data processing system 102 can automatically include the information in a deep link 126, is not allowed to include the information in a deep link 126, or must receive end user approval before including the information in the deep link 126.

The data repository 124 can store event identifiers 130 as one or data structures or data files. As described herein, the authorization component 122 can monitor or count the number of times that a client computing device 104 establishes a connection with a digital component provider device 106 or requests digital components from the digital component provider device 106 without registering or authenticating with the digital component provider device 106 or data processing system 102. The event identifiers 130 can refer to aspects of current and past requests a client computing device 104 makes with a digital component provider device 106 or the data processing system 102. The event identifiers 130 can include one or more data structures that can indicate when and the duration of connections between a client computing device 104 and a digital component provider device 106 that were not authorized by an end user. The event identifiers can include an indication of the input audio file (e.g., a unique identifier), an indication of to which digital component provider device 106 the request was directed, and an indication (e.g., hash) of the client computing device 104 that included the input audio file.

The data repository 124 store content data 132 that can include, for example, digital components provided by a digital component provider device 106 or obtained or determined by the data processing system 102 to facilitate content selection. The content data 132 can include, for example, digital components (or digital component object) that can include, for example, a content item, an online document, audio, images, video, multimedia content, or third-party content. The digital component provider device 106 can provide full-length digital components to the data processing system 102 to store as content data 132. The digital component provider device 106 can provide subportions of the digital components to the data processing system 102. The data processing system 102 can provide the subportions of the digital components to the client computing device 104 until the account or subscription through which the client computing device 104 accesses the digital components is authorized. The subportions of the digital components can include the first predetermined minutes or seconds of a digital component (e.g., a song, TV show, movie, or other video) or sample associated with the requested digital component. For example, if the digital component is a movie, the sample that is transmitted to the data processing system 102 as a subportion can be the trailer for the movie.

Figure 2:
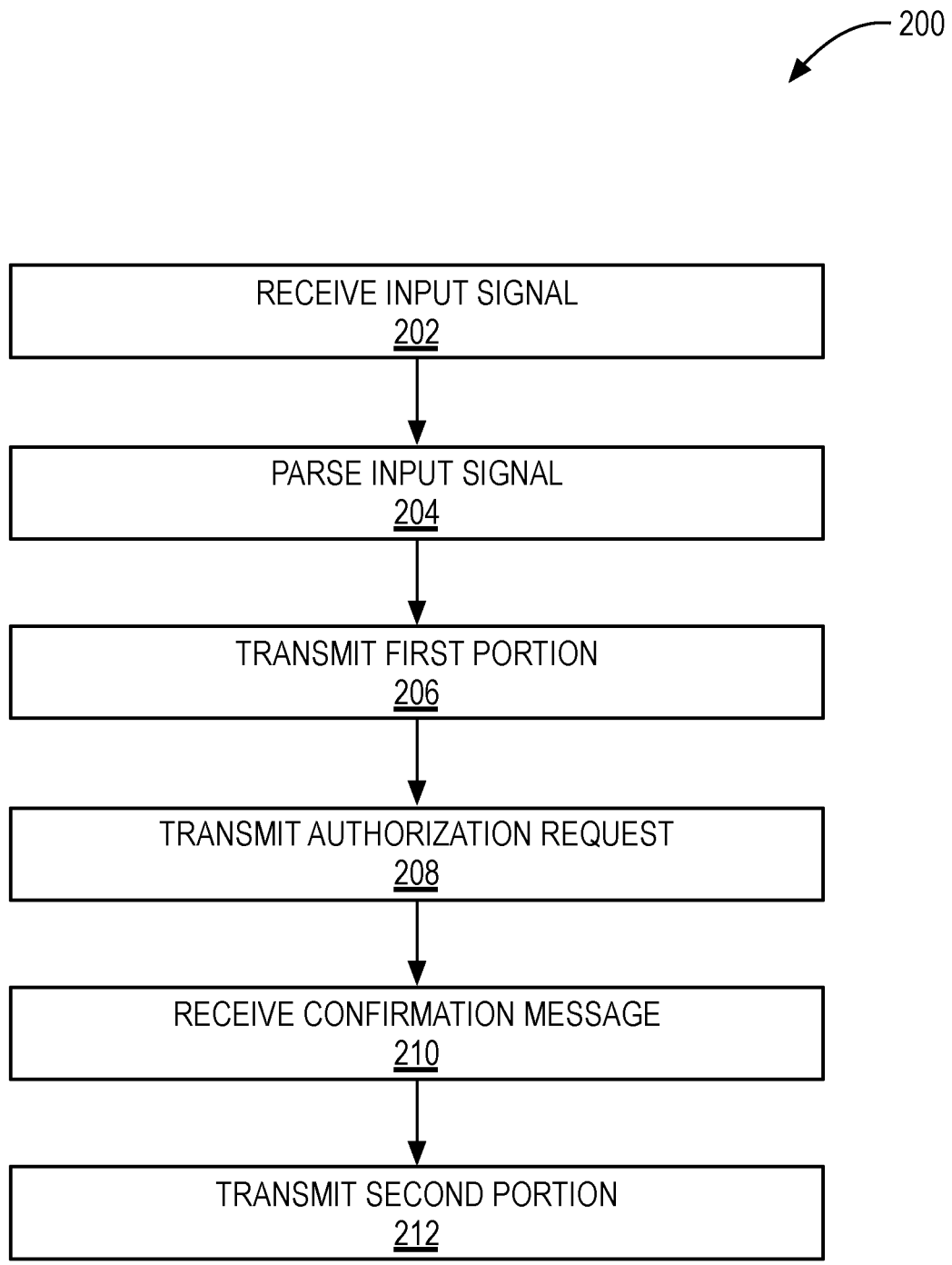
FIG. 2 illustrates a block diagram of an example method to authenticate computing devices in the system illustrated in FIG. 1, in accordance with an example of the present disclosure.

FIG. 2 illustrates a block diagram of an example method 200 to authenticate computing devices. The method 200 can include receiving an input signal (ACT 202). The method 200 can include parsing the input signal (ACT 204). The method 200 can include transmitting a first portion of a digital component to a client computing device (ACT 206). The method 200 can include transmitting an authorization request (ACT 208). The method 200 can include receiving a confirmation message (ACT 210). The method 200 can include transmitting a second portion of the digital component to the client computing device (ACT 212).

Figure 3:
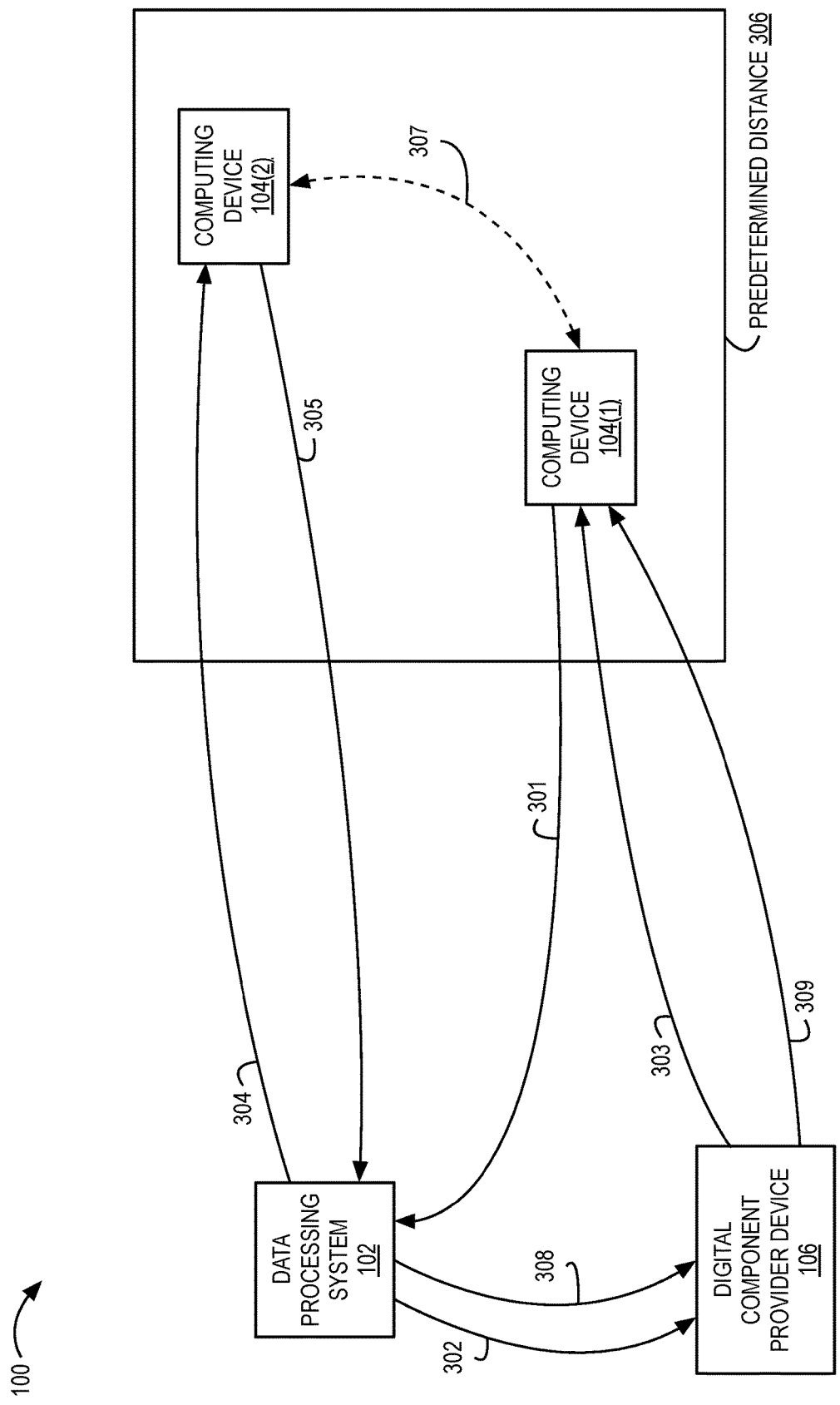
FIG. 3 illustrates a block diagram illustrating the network transmissions between the components of the system illustrated in FIG. 1, in accordance with an example of the present disclosure.
Figure 4:
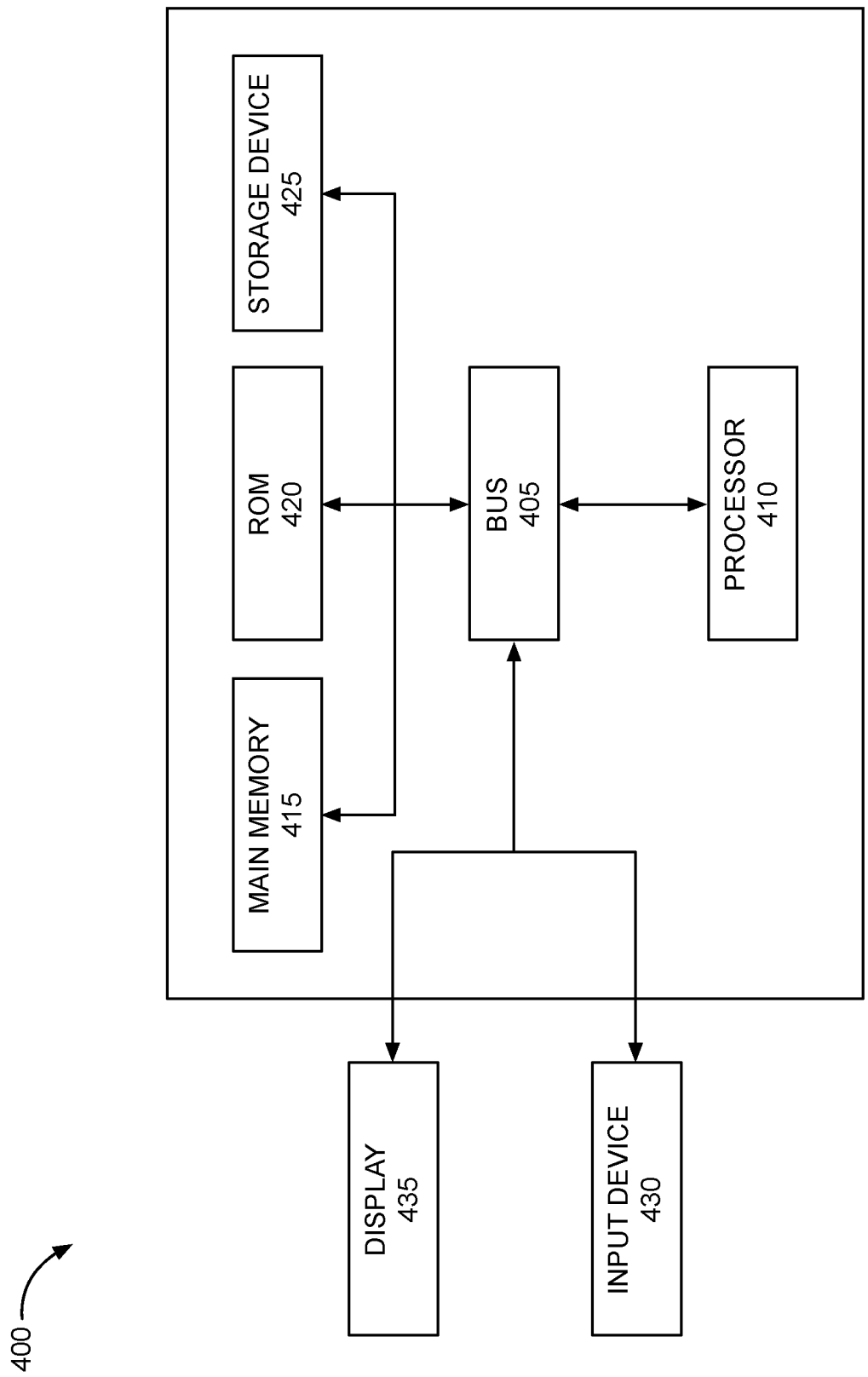
FIG. 4 is a block diagram of an example computer system that can be used in the system illustrated in FIG. 1, in accordance with an example of the present disclosure.

The method 200 can be performed by one or more component or system illustrated in FIG. 1, FIG. 3, or FIG. 4. As set forth above, the method 200 can include receiving an input signal (ACT 202). The method can include receiving, by a natural language processor component executed by a data processing system, the input signal. The input signal can be an input audio signal that is detected by a sensor at a first client device. The sensor can be a microphone of the first client device. For example, a digital assistant component executed at least partially by a data processing system that includes one or more processors and memory can receive the input audio signal. The input audio signal can include a conversation facilitated by a digital assistant. The conversation can include one or more inputs and outputs. The conversation can be audio based, text based, or a combination of audio and text. The input audio signal can include text input, or other types of input that can provide conversational information. The data processing system can receive the audio input for a session corresponding to the conversation. The data processing system can receive the audio input in one or more portions or as a bulk or batch upload (e.g., multiple portions of the conversations uploaded in a single transmission to reduce the number of transmissions).

The method 200 can include parsing the input signal (ACT 204). The NLP component of the data processing system can parse the input signal to identify a digital component request. The NLP component can identify a trigger keyword in the input signal. For example, the input audio signal can include "OK, play today's top hits from my music service." The NLP component can parse the input signal to determine the requested digital component is a music playlist of "top hits." The NLP component can determine that the trigger keyword is to play, which can indicate that the end user wants to start streaming the songs on the music playlist to the client computing device. The data processing system can determine that my music service is the digital component provider device that the end user is requesting provide digital components (e.g., songs).

The method 200 can include transmitting a first portion of a digital component (ACT 206). The digital component selector can select a digital component based on the request identified in the input audio signal. The digital component can include a song, stream or plurality of songs, video, application, image, or other digital content. The portion of the digital component can be or include a segment of the digital component (e.g., a video segment of the first few minutes of a video file) or a digital component related to the requested digital component. For example, the portion of the digital component can include trailer, teaser, or other content related to the requested digital component. The data processing system can transmit the request to the digital component provider device, which can provide the portion of the digital component to the client computing device. The data processing system can store digital components and portions thereof provided by the digital component provider device in the data repository, and the data processing system can provide the digital components and portions thereof to the client computing device. The data processing system can establish a connection between the digital component provider device and the client computing device to enable the digital component provider device to provide the digital components and portions thereof to the client computing device. The data processing system can transmit or initiation the transmission of the portion of the digital component to the client computing device without completing an authorization of the client computing device. For example, if the digital component is part of a subscription service or a pay-for content item, the data processing system can transmit the portion of the digital component to the client computing device without requiring payment or the end user of the client computing device to sign up for the required subscription.

The method 200 can include transmitting an authorization request (ACT 208). The client computing device can receive and begin to render, play, or present the portion of the digital component to the end user of the client computing device prior to requiring payment, login, or authorization to render, play, or present the digital component to the user via the client computing device. The authorization component can transmit the authorization request to a second client computing device. The second client computing device can be associated with the first client computing device. For example, both the first and the second client computing device can be registered to the same end user. The authorization request can include a request to transmit a second portion of the digital component to the first client computing device. For example, the request identified at ACT 204 can be to stream music to the client computing device to a speaker-based assistant device. The first portion of the digital component can be a stream of the music limited to five minutes in duration. In this example, as the first client computing device plays the five-minute stream of the music, the authorization component can transmit the authentication request to a second client computing device. The second client computing device can be the end user's mobile device. The authorization request can include deep links that cause a registration page associated with the digital component provider device providing the streaming music to open. The deep link can include information that is populated into the registration page.

The method 200 can include receiving a confirmation message (ACT 210). The data processing system can receive the confirmation message from the client computing device to which the authorization request was transmitted. The data processing system can transmit the authorization request to and receive the confirmation message from a second client computing device that is different from the client computing device to which the first portion of the digital component was transmitted. The data processing system can receive the confirmation message from the digital component provider device. For example, the authorization request can include a deep-link that populates a registration page to register with a service provided by the digital component provider device. Accepting the authorization request at the second client computing device can cause the second client computing device to transmit the registration information to the digital component provider device to, for example, create an account with the digital component provider device. Once the end user's account is established at the digital component provider device (based on receiving the registration information), the digital component provider device can transmit a message to the data processing system with confirmation message indicating the end user is registered with the digital component provider device.

The method 200 can include transmitting a second portion of the digital component (ACT 212). The data processing system can transmit a second portion of the digital component to the digital component that received the first portion of the digital component. The second portion of the digital component can be the remaining portion of the digital component that was not included in the first portion. The second portion of the digital component can be additional digital components. For example, the first portion can be a first song in a playlist and the second portion can the subsequent songs in the playlist.

FIG. 3 illustrates a block diagram of the system 100 and the network transmissions between the components of the system 100 during, for example, the acts of method 200.

The client computing device 104(1) can receive an audio signal from an end user. The client computing device 104(1) can detect the audio signal with a sensor, such a microphone. The client computing device 104(1) can convert the audio signal into an input audio signal and transmit the input audio signal to the data processing system 102 in transmission 301. The transmission 301 (and the other transmission illustrated in FIG. 3) can be established over a network similar to the network 105 illustrated in FIG. 1. The input audio signal can include a request for a digital component that is provided to the client computing device 104(1) by the digital component provider device 106. The digital component provider device 106 can provide the digital component directly over the network 105 to the client computing device 104(1) or through the data processing system 102. The digital components provided by the digital component provider device 106 can be provided as part of a subscription (e.g., streaming music service) or are pay-for content (e.g., a streaming movie).

Based on receiving the request in the input audio signal, the data processing system 102 and the digital component provider device 106 can provide a first portion of the digital component to the client computing device 104. The data processing system 102, through a transmission 302, can instruct the digital component provider device 106 to transmit the first portion of the digital component to the digital component provider device 106. The data processing system 102 can also establish a session between the digital component provider device 106 and the client computing device 104. Through the transmission 302, the data processing system 102 can interact with the digital component provider device 106 through an API call to the services or digital components provided by the digital component provider device 106. The digital component provider device 106 can transmit the first portion to the client computing device 104 via a transmission 303 to the client computing device 104(1). The first portion can be transmitted in bulk or batch transmissions or the first portion of the digital component can be streamed to the client computing device 104.

The data processing system 102 can determine whether the client computing device 104(1) previously requested digital components from the digital component provider device 106. If the client computing device 104(1) previously requested digital components from the digital component provider device 106, the data processing system 102 can decline to transmit the first portion of the digital component to the client computing device 104(1). The data processing system 102 can decline to transmit the first portion of the digital component to the client computing device 104(1) but can transmit the authorization request to the client computing device 104(2). If the data processing system 102 receives a confirmation message from the client computing device 104(2), the data processing system 102 may then transmit the requested digital component to the client computing device 104(1).

In response to or before the transmission of the first portion of the digital component to the client computing device 104(1), the data processing system 102 can transmit an authorization request to the client computing device 104(2) through a transmission 304. The client computing device 104(1) and the client computing device 104(2) can be associated with the same end user. If the service or digital components provided by the digital component provider device 106 require a subscription, the authorization request can include information for starting a subscription with the digital component provider device 106 or can include a deep link that at least partially fills in fields of a registration form. The authorization request can be or include a message asking the user of the client computing device 104(2) if the user would like to authorize the transmission of the digital component requested in the input audio signal to the client computing device 104(1).

In response to receiving the authorization request, the client computing device 104(2) can transmit a confirmation message to the data processing system 102 indicating that the end user of the client computing device 104(2) authorizes transmission of the requested digital component to the client computing device 104(1). If the end user does not wish to authorize the transmission of the digital component to the client computing device 104(2), the end user can decline the authorization request causing the client computing device 104(2) to transmit a declining message to the data processing system 102 in the transmission 305. If the data processing system 102 does not receive a confirmation message from the client computing device 104(2) within a predetermined time of transmitting the authorization request to the client computing device 104(2), the data processing system 102 can register the non-response as if the data processing system 102 received a declining message. The client computing device 104(2) can automatically transmit a declining message (or the data processing system 102 can register a non-response) based on a time delay between since an action or context occurred at the client computing device 104(2). Once the time delay crosses a predetermined threshold, the client computing device 104(2) can transmit the declining message to the data processing system 102. The action can be the opening of the confirmation message, the receipt of the confirmation message, or the opening of an application, among others. For example, if the client computing device 104(2) receives the confirmation message and the end user of the client computing device 104(2) opens the confirmation message but does not enter a response, the confirmation message can time out once the predetermined time delay threshold is reached and automatically send the declining message to the data processing system 102. The context can be a location context or an application context, among others. For example, the client computing device 104(2) can automatically generate and transmit a declining message to the data processing system 102 if the end user does not respond to the confirmation message a predetermined amount of time after the context is initiated. The predetermined amount of time can be based on the action or the context. For example, if the context is a first location, such as the user's house, the predetermined time delay can be a first length of time, and if the context is a second location, such as in the user's car, the predetermined time delay may be longer or shorter.

The data processing system 102 can determine the client computing device 104(2) is within a predetermined distance 306 of the client computing device 104(1) and automatically generate a confirmation message to the authorization request. The predetermined distance 306 can be defined by a physical distance. For example, the predetermined distance can be defined by a radius of 5 ft, 10 ft, 30 ft, 50 ft, 100 ft, or more from the location of the client computing device 104(1). The predetermined distance 306 can be defined by a geographical designation. For example, the predetermined distance 306 can include two locations within the same home, building, city, county, country, zip code, or other geographic region. The predetermined distance can be defined by a proximity between the client computing device 104(1) and the client computing device 104(2). The proximity can be defined by the distance over which the client computing device 104(1) and the client computing device 104(2) can establish a connection 307 with one another. For example, the predetermined distance 306 can be defined by a wireless or wired network, a Bluetooth link, or a sub-audible signal generated by one client computing device 104 and detected by the other client computing device 104.

When the client computing device 104(1) and the client computing device 104(2) are within the predetermined distance 306 of one another, the client computing device 104(1) can indicate that the client computing device 104(2) is within the predetermined distance of the client computing device 104(2) as metadata in the input audio signal. The client computing device 104(2) can determine it is within the predetermined distance 306 of the client computing device 104(1) and automatically respond to the authorization request. The authorization request can request different levels of authorization or information based on whether the client computing device 104(2) is within the predetermined distance 306 of the client computing device 104(1). For example, the client computing device 104(2) may be able to respond to the authorization request without entering a password at the client computing device 104(2) when the client computing device 104(2) is within the predetermined distance, but the password may be required when the client computing device 104(2) is not within the predetermined distance 306.

In response to receiving the confirmation message, the data processing system 102 can establish send transmission 308 to the digital component provider device 106. Via the transmission 308, the data processing system 102 can instruct the digital component provider device 106 to transmit the second portion of the requested digital component to the client computing device 104(1) or indicate to the digital component provider device 106 that an authorization message was received. Through a transmission 309, the digital component provider device 106 can provide the second portion of the digital component to the client computing device 104(1).

According to at least one aspect of the disclosure, the method may further include selecting, by the content selection component, a first digital component and a second digital component based at least on the first digital component request and transmitting, by the content selection component and to the second client device, the second digital component. The first client device and the second client device may both be associated with a same user. The method may further include receiving, by the natural language processor component, a second input audio signal detected by the sensor at the first client device. The second input audio signal may be parsed by the natural language processor component to identify a second digital component request in the second input audio signal. The authorization component may determine that a first portion of the second digital component was previously transmitted to the first client device and the authorization component may decline to transmit the first portion of the second digital component to the first client device. The method may further include transmitting, by the authorization component, a second authorization request to the second client device to authorize transmission of the digital component to the first client device.

The method may further include receiving, by the natural language processor component, a second input audio signal detected by the sensor at the first client device. The natural language processor component may parse the second input audio signal to identify a second digital component request in the second input audio signal. The authorization component may determine that a first portion of the second digital component was previously transmitted to the first client device and the content selection component may transmit a subportion of first portion of the second digital component to the first client device.

The method may further include receiving, by the natural language processor component, a second input audio signal detected by the sensor at the first client device. The natural language processor component may parse the second input audio signal to identify a second digital component request in the second input audio signal. It may be determined, by the authorization component, that the second client device is within a predetermined distance from the first client device, and the content selection component may transmit the second digital component to the first client device based on determining the second client device is within the predetermined distance form the first client device. The authorization component may receive a message indicating that the second client device is within the predetermined distance of the first client device.

The method may further include generating, by the authorization component, a payload comprising at least one of an indication of a content provider configured to provide the first digital component, a uniform resource locator (URL) associated with the content provider, or registration information associated with the content provider.

The method may further include receiving, by the natural language processor component, a second input audio signal detected by the sensor at the first client device. The natural language processor component may parse the second input audio signal to identify a second digital component request in the second input audio signal. The content selection component may stream the second digital component to the first client device. The authorization component may transmit a second authorization request to the second client device to authorize streaming of the digital component to the first client device, and the authorization component may terminate the streaming of the second digital component to the first client device based on not receiving a response to the second authorization request within a predetermined time.

The method may further comprise receiving, by the natural language processor component, a second input audio signal detected by the sensor at the first client device. The natural language processor component may parse the second input audio signal to identify a second digital component request in the second input audio signal. The content selection component may stream the second digital component to the first client device. The authorization component may stream a second authorization request to the second client device to authorize streaming of the digital component to the first client device. The authorization component may receive a declining message in response to the second authorization request and the authorization component may terminate the streaming of the second digital component to the first client device based on receiving the declining message.

FIG. 4 is a block diagram of an example computer system 400. The computer system or computing device 400 can include or be used to implement the system 100, or its components such as the data processing system 102. The data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 124. The main memory 415 can also be used for storing position information, temporary variables, or other intermediate information during execution of instructions by the processor 410. The computing system 400 may further include a read-only memory (ROM) 420 or other static storage device coupled to the bus 405 for storing static information and instructions for the processor 410. A storage device 425, such as a solid-state device, magnetic disk or optical disk, can be coupled to the bus 405 to persistently store information and instructions. The storage device 425 can include or be part of the data repository 124.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 104 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the interface 110, digital component selector 120, or NLP component 114 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output.

The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 104 or the digital component provider device 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 114 or the digital component selector 120, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the computing device 104 can generate the packaged data object and forward it to the third-party application when launching the application. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A system to authenticate computing devices in a networked environment, comprising:

a data processing system comprising one or more processors and memory having computer-readable instructions that when executed cause the one or more processors to:
receive an input audio signal detected by a sensor at a first client device;
parse the input audio signal to identify a first digital component request in the input audio signal;
transmit, to the first client device, a first portion of a first digital component selected based at least on the first digital component request;
transmit, to a second client device to authorize transmission of a second portion of the first digital component to the first client device, an authorization request transmitted to the second client device based at least on transmission of the first portion of the first digital component to the first client device, the authorization request separate from the first portion and the second portion of the first digital component;
receive a confirmation message in response to the authorization request;
transmit the second portion of the first digital component to the first client device based at least on receiving the confirmation message;
receive a second input audio signal to identify a second digital component request in the second input audio signal;
parse the second input audio signal to identify a second digital component request in the second input audio signal;
determine that a first portion of the second digital component was previously transmitted to the first client device; and
transmit a subportion of the first portion of the second digital component to the first client device.

2. The system of claim 1, wherein the first client device and the second client device are both associated with a same user.

3. The system of claim 1, comprising the computer-readable instructions to cause the one or more processors to:
decline by the authorization component, to transmit a second portion of the second digital component to the first client device.

4. The system of claim 3, comprising the computer-readable instructions to cause the one or more processors to transmit a second authorization request to the second client device to authorize transmission of the digital component to the first client device.

5. The system of claim 1, comprising the computer-readable instructions to cause the one or more processors to:
determine a time delay based on an action of the second client device; and
decline to transmit a second portion of the second digital component to the first client device based at least on the time delay based on the action of the second client device exceeding a predetermined threshold.

6. The system of claim 1, comprising the computer-readable instructions to cause the one or more processors to:
determine a time delay based on a context of the second client device; and
decline to transmit a second portion of the second digital component to the first client device based at least on the time delay based on the context of the second client device exceeding a predetermined threshold.

7. The system of claim 1, comprising the computer-readable instructions to cause the one or more processors to:
determine that the second client device is within a predetermined distance from the first client device; and
transmit the second digital component to the first client device based on determining the second client device is within the predetermined distance from the first client device.

8. The system of claim 7, comprising the computer-readable instructions to cause the one or more processors to receive a message indicating that the second client device is within the predetermined distance from the first client device.

9. The system of claim 1, comprising the computer-readable instructions to cause the one or more processors to generate a payload comprising at least one of an indication of a content provider configured to provide the first digital component, a uniform resource locator (URL) associated with the content provider, or registration information associated with the content provider.

10. The system of claim 1, comprising the computer-readable instructions to cause the one or more processors to:
stream the second digital component to the first client device;
transmit a second authorization request to the second client device to authorize streaming of the second digital component to the first client device; and
terminate the streaming of the second digital component to the first client device based on not receiving a response to the second authorization request within a predetermined time.

11. The system of claim 1, comprising the computer-readable instructions to cause the one or more processors to:
stream the second digital component to the first client device;
transmit a second authorization request to the second client device to authorize streaming of the second digital component to the first client device;
receive a declining message in response to the second authorization request; and
terminate the streaming of the second digital component to the first client device based on receiving the declining message.

12. A method to authenticate computing devices, comprising:
receiving, by a natural language processor component executed by a data processing system and via an interface of the data processing system, an input audio signal detected by a sensor at a first client device;
parsing, by the natural language processor component, the input audio signal to identify a first digital component request in the input audio signal;
transmitting, by a content selection component and to the first client device, a first portion of a first digital component selected based at least on the first digital component request;
transmitting, by an authorization component, an authorization request to a second client device to authorize transmission of a second portion of the first digital component to the first client device, the authorization request transmitted to the second client device based at least on transmitting the first portion of the first digital component to the first client device, the authorization request separate from the first portion and the second portion of the first digital component;
receiving, by the authorization component from the second client device, a confirmation message in response to the authorization request;

transmitting, by the content selection component, the second portion of the first digital component to the first client device based at least on receiving the confirmation message from the second client device;
receiving, by the natural language processor component, a second input audio signal detected by the sensor at the first client device;
parsing, by the natural language processor component, the second input audio signal to identify a second digital component request in the second input audio signal;
determining, by the authorization component, that a first portion of the second digital component was previously transmitted to the first client device; and
transmitting, by the content selection component, a subportion of the first portion of the second digital component to the first client device.

13. The method of claim 12, comprising:
declining, by the authorization component, to transmit a second portion of the second digital component to the first client device.

14. The method of claim 12, comprising:
determining, by the authorization component, that the second client device is within a predetermined distance from the first client device; and
transmitting, by the content selection component, the second digital component to the first client device based on determining the second client device is within the predetermined distance from the first client device.

15. The method of claim 14, comprising:
receiving, by the authorization component, a message indicating that the second client device is within the predetermined distance from the first client device.

16. The method of claim 12, comprising:
generating, by the authorization component, a payload comprising at least one of an indication of a content provider configured to provide the first digital component, a uniform resource locator (URL) associated with the content provider, or registration information associated with the content provider.

17. The method of claim 12, comprising:
streaming, by the content selection component, the second digital component to the first client device;
transmitting, by the authorization component, a second authorization request to the second client device to authorize streaming of the second digital component to the first client device; and
terminating, by the authorization component, the streaming of the second digital component to the first client device based on not receiving a response to the second authorization request within a predetermined time.

18. The method of claim 12, comprising:
streaming, by the content selection component, the second digital component to the first client device;
transmitting, by the authorization component, a second authorization request to the second client device to authorize streaming of the second digital component to the first client device;
receiving, by the authorization component, a declining message in response to the second authorization request; and
terminating, by the authorization component, the streaming of the second digital component to the first client device based on receiving the declining message.

19. A system to authenticate computing devices in a networked environment, comprising:
a data processing system comprising one or more processors and memory having computer-readable instructions that when executed cause the one or more processors to:
receive an input audio signal detected by a sensor at a first client device;
parse the input audio signal to identify a first digital component request in the input audio signal;
transmit, to the first client device, a first portion of a first digital component selected based at least on the first digital component request;
transmit, to a second client device to authorize transmission of a second portion of the first digital component to the first client device, an authorization request transmitted to the second client device based at least on transmission of the first portion of the first digital component to the first client device, the authorization request separate from the first portion and the second portion of the first digital component;
receive a confirmation message in response to the authorization request;
transmit the second portion of the first digital component to the first client device based at least on receiving the confirmation message;
receive a second input audio signal detected by the sensor at the first client device;
parse the second input audio signal to identify a second digital component request in the second input audio signal;
stream the second digital component to the first client device;
transmit a second authorization request to the second client device to authorize streaming of the digital component to the first client device; and
terminate the streaming of the second digital component to the first client device based on not receiving a response to the second authorization request within a predetermined time.

20. A method to authenticate computing devices, comprising:
receiving, by a natural language processor component executed by a data processing system and via an interface of the data processing system, an input audio signal detected by a sensor at a first client device;
parsing, by the natural language processor component, the input audio signal to identify a first digital component request in the input audio signal;
transmitting, by a content selection component and to the first client device, a first portion of a first digital component selected based at least on the first digital component request;
transmitting, by an authorization component, an authorization request to a second client device to authorize transmission of a second portion of the first digital component to the first client device, the authorization request transmitted to the second client device based at least on transmitting the first portion of the first digital component to the first client device, the authorization request separate from the first portion and the second portion of the first digital component;
receiving, by the authorization component from the second client device, a confirmation message in response to the authorization request;
transmitting, by the content selection component, the second portion of the first digital component to the first client device based at least on receiving the confirmation message from the second client device;

receiving, by the natural language processor component, a second input audio signal detected by the sensor at the first client device;

parsing, by the natural language processor component, the second input audio signal to identify a second digital component request in the second input audio signal;

streaming, by the content selection component, the second digital component to the first client device;

transmitting, by the authorization component, a second authorization request to the second client device to authorize streaming of the second digital component to the first client device; and terminating, by the authorization component, the streaming of the second digital component to the first client device based on not receiving a response to the second authorization request within a predetermined time.

* * * * *